(12) United States Patent  (10) Patent No.: US 8,873,953 B2
Zhang et al.  (45) Date of Patent: Oct. 28, 2014

(54) MULTIPLE-SYMBOL POLARIZATION SWITCHING FOR DIFFERENTIAL-DETECTION MODULATION FORMATS

(75) Inventors: Shaoliang Zhang, Plainsboro, NJ (US); Fatih Yaman, Monmouth Junction, NJ (US); Lei Xu, Princeton Junction, NJ (US); Ting Wang, West Windsor, NJ (US); Yoshihisa Inada, Tokyo (JP); Takaaki Ogata, Tokyo (JP); Yasuhiro Aoki, Tokyo (JP)

(73) Assignee: NEC Laboratories America, Inc., Princeton, NJ (US)

( * ) Notice: Subject to any disclaimer, the term of this patent is extended or adjusted under 35 U.S.C. 154(b) by 279 days.

(21) Appl. No.: 13/523,103

(22) Filed: Jun. 14, 2012

(65) Prior Publication Data

US 2012/0321303 A1  Dec. 20, 2012

Related U.S. Application Data

(60) Provisional application No. 61/497,989, filed on Jun. 17, 2011.

(51) Int. Cl.
| | |
|---|---|
| *H04Q 11/00* | (2006.01) |
| *H04B 10/04* | (2006.01) |
| *H04J 14/06* | (2006.01) |
| *H04B 10/532* | (2013.01) |
| *H04B 10/556* | (2013.01) |

(52) U.S. Cl.
CPC ....... *H04Q 11/00* (2013.01); *H04Q 2213/1301* (2013.01); *H04B 10/532* (2013.01); *H04B 10/5561* (2013.01)
USPC ............... 398/45; 398/43; 398/182; 398/183; 398/184

(58) Field of Classification Search
USPC .................................. 398/45, 182, 183, 184
See application file for complete search history.

(56) References Cited

U.S. PATENT DOCUMENTS

| 7,844,186 | B2* | 11/2010 | Dorrer et al. ................... 398/184 |
|---|---|---|---|
| 8,073,338 | B2* | 12/2011 | Buelow ......................... 398/184 |
| 8,417,126 | B2* | 4/2013 | Mandai et al. ................. 398/184 |
| 8,437,644 | B2* | 5/2013 | Zhang et al. ................... 398/188 |
| 2003/0020985 | A1* | 1/2003 | LaGasse et al. ............... 359/135 |
| 2004/0252929 | A1* | 12/2004 | Kim et al. .......................... 385/1 |
| 2005/0074245 | A1* | 4/2005 | Griffin .......................... 398/188 |
| 2005/0286904 | A1* | 12/2005 | Calabro et al. ................. 398/152 |
| 2007/0206960 | A1* | 9/2007 | Nissov et al. .................. 398/188 |
| 2009/0060508 | A1* | 3/2009 | Tanimura et al. ............... 398/65 |
| 2009/0074428 | A1* | 3/2009 | Liu ............................... 398/208 |
| 2009/0147896 | A1* | 6/2009 | Frankel et al. ................. 375/354 |
| 2010/0067914 | A1* | 3/2010 | Tanaka et al. .................. 398/102 |
| 2010/0098435 | A1* | 4/2010 | Akiyama ....................... 398/188 |
| 2010/0135676 | A1* | 6/2010 | Katagiri ........................ 398/204 |
| 2010/0189437 | A1* | 7/2010 | Hoshida .......................... 398/65 |
| 2010/0215374 | A1* | 8/2010 | Liu et al. ......................... 398/98 |
| 2010/0239264 | A1* | 9/2010 | Yang et al. ....................... 398/98 |

(Continued)

*Primary Examiner* — Oommen Jacob
(74) *Attorney, Agent, or Firm* — Joseph Kolodka

(57) ABSTRACT

An inventive method for multi-symbol polarization switching for differential detection optical systems includes modulating a laser source by a DQPSK modulator, driving the DQPSK modulator with a data block configured for generating multi-symbol polarization-switched DQPSK differential-encoded signals, and polarizing the multi-symbol polarization-switched DQPSK signals with a polarizing modulator whose modulation speed is based on how often polarization states vary, wherein the data block provides a bits manipulation to provide the multi-symbol polarization switching thereby enabling differential detection for recovering correct original data by a receiver.

6 Claims, 4 Drawing Sheets

(56) References Cited

U.S. PATENT DOCUMENTS

| | | | |
|---|---|---|---|
| 2011/0158654 A1* | 6/2011 | Zhang et al. | 398/158 |
| 2011/0182589 A1* | 7/2011 | Kotake et al. | 398/152 |
| 2011/0274430 A1* | 11/2011 | Nakashima et al. | 398/65 |
| 2012/0027410 A1* | 2/2012 | Xu et al. | 398/65 |
| 2012/0106962 A1* | 5/2012 | Tanimura et al. | 398/65 |
| 2012/0321303 A1* | 12/2012 | Zhang et al. | 398/45 |

* cited by examiner

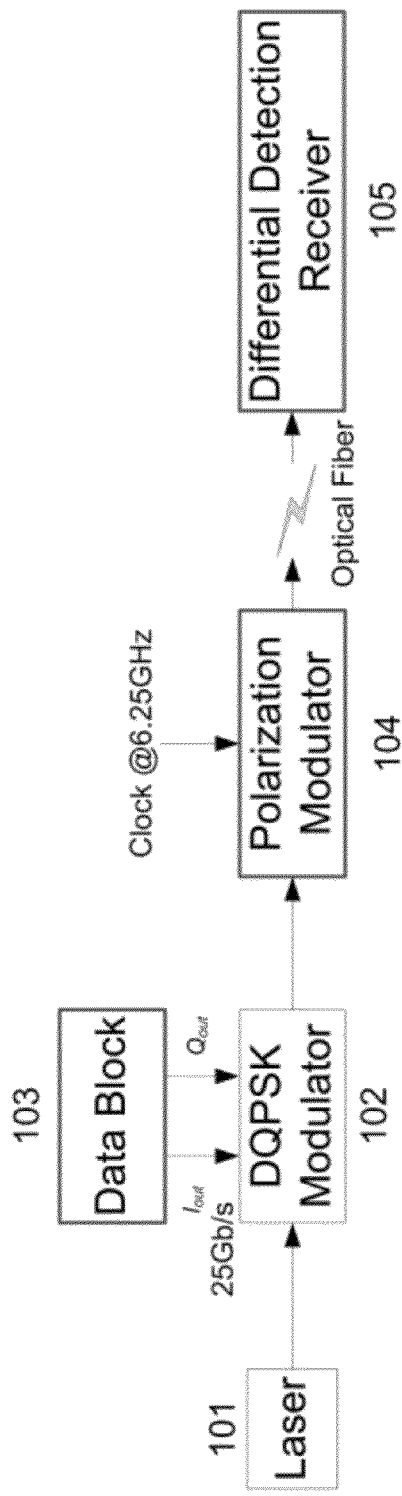
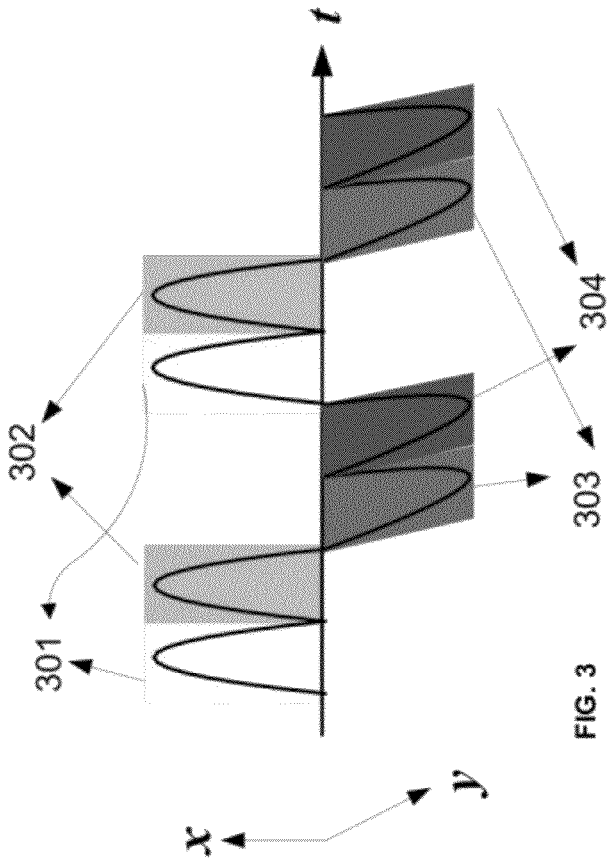

MULTIPLE-SYMBOL POLARIZATION SWITCHING FOR DIFFERENTIAL-DETECTION MODULATION FORMATS

This application claims the benefit of U.S. Provisional Application No. 61/497,989, entitled "Multiple Symbol Polarization Switching Differential-Detection Modulation Formats", filed Jun. 17, 2011, of which the contents are incorporated herein by reference.

BACKGROUND OF THE INVENTION

The present invention relates generally to optical communications and, more particularly, to multiple symbol polarization switching differential-detection modulation formats.

As Internet traffic grows exponentially because of a variety of user terminals and internet services, it has prompted strong research interests on high-speed optical networks, which are the backbone infrastructure of current "Globe Village". The data rate for optical fiber communications has moved from 10 Gbits/s to 40 Gb/s and 100 Gbits/s or even 1 Tbits/s per channel. However, one of the major challenges facing the ultra-high-data-rate dense wavelength division multiplexing (DWDM) optical fiber transmissions is the fiber nonlinearity, which causes optical signal distortions due to the various nonlinear effects in optical fiber and sets the limit of the maximal reach. DQPSK modulation is an important format for high-speed optical communications by transmitting 2 bits per symbol. At 40 Gb/s, DQPSK systems employing direct detection are attractive by having low complexity and being generally available.

In a digital coherent optical communication system, different types of digital signal processing (DSP) functions can be applied, to mitigate the fiber nonlinearity, such as digital back-propagation algorithms. However, the existing DSP-based fiber nonlinearity mitigation algorithms are demanding on the hardware resources, which are relatively limited and sophisticated due to the requirements of very high electronic processing bandwidth. Meanwhile, most of the existing nonlinearity mitigation algorithms show very limited system performance improvements in real experimental testing.

In another approach, the phase conjugation scheme has been proposed to improve the systems' nonlinearity tolerance. However, the deployment of this scheme requires at the exact middle point of the entire transmission link, thus imposing a strict and thus unpractical restrictions on the system deployment. Its spectrum efficiency would be halved because of the fiber four-wave mixing effects. In another prior effort, the polarization states for adjacent symbols are arranged in orthogonal states for improving fiber nonlinearity tolerance.

Accordingly, there is a need for a low-cost solution to increase the nonlinearity tolerance of a direct-detection optical DQPSK system

BRIEF SUMMARY OF THE INVENTION

In an aspect of the present invention, a method for multi-symbol polarization switching for differential detection optical systems includes modulating a laser source by a DQPSK modulator, driving the DQPSK modulator with a data block configured for generating multi-symbol polarization-switched DQPSK differential-encoded signals, and polarizing the multi-symbol polarization-switched DQPSK signals with a polarizing modulator whose modulation speed is based on how often polarization states vary, wherein the data block provides a bits manipulation to provide the multi-symbol polarization switching thereby enabling differential detection for recovering correct original data by a receiver.

These and other advantages of the invention will be apparent to those of ordinary skill in the art by reference to the following detailed description and the accompanying drawings.

BRIEF DESCRIPTION OF THE DRAWINGS

FIG. 1 is a schematic of polarization-switched DPSK optical system, in accordance with the invention;

FIG. 3 is a diagram illustrating 2-symbol polarization-switched pulses, in accordance with the invention;

DETAILED DESCRIPTION

It is suggested in prior literatures that using polarization switching should increase the nonlinearity tolerance of optical communication signals. If the two neighboring symbols are located at orthogonal polarization states, the inter-symbol interference between the two neighboring symbols does not generate coherent beating, and thus suffers from reduced nonlinear distortions. The modification to current system structure is relatively small and it can be readily applied in different direction-detection systems. In this invention record, we focus on RZ-DQPSK format, which is popular for 40 Gb/s-based long-haul optical communication systems. Compared to OOK format, the differential precoding and decoding in DQPSK/DPSK would require additional arrangement. We systematically describe the design of transmitter and receiver in this proposed multi-symbol polarization-switching scheme. Introducing polarization switching by several symbols is proven capable of mitigating the inter-symbol interference in the RZ-DQPSK system while reducing the requirements on the polarization switching speed at the transmitter side.

The diagram of FIG. 1 shows that the schematic of the polarization-switched DQPSK system operating at 50 Gbits/s. The output of the laser (101) is modulated by a DQPSK modulator, which is driven by the data block (103) that is specially designed for multi-symbol polarization-switched DQPSK signals. In subsequent, the generated DQPSK signals are polarized using a polarization modulator (104). Its modulation speed actually depends on how often the polarization states vary. After transmitting over the optical fiber link, the received polarization-switched DQPSK signals are differentially detected by the receiver (105).

Figure 2:
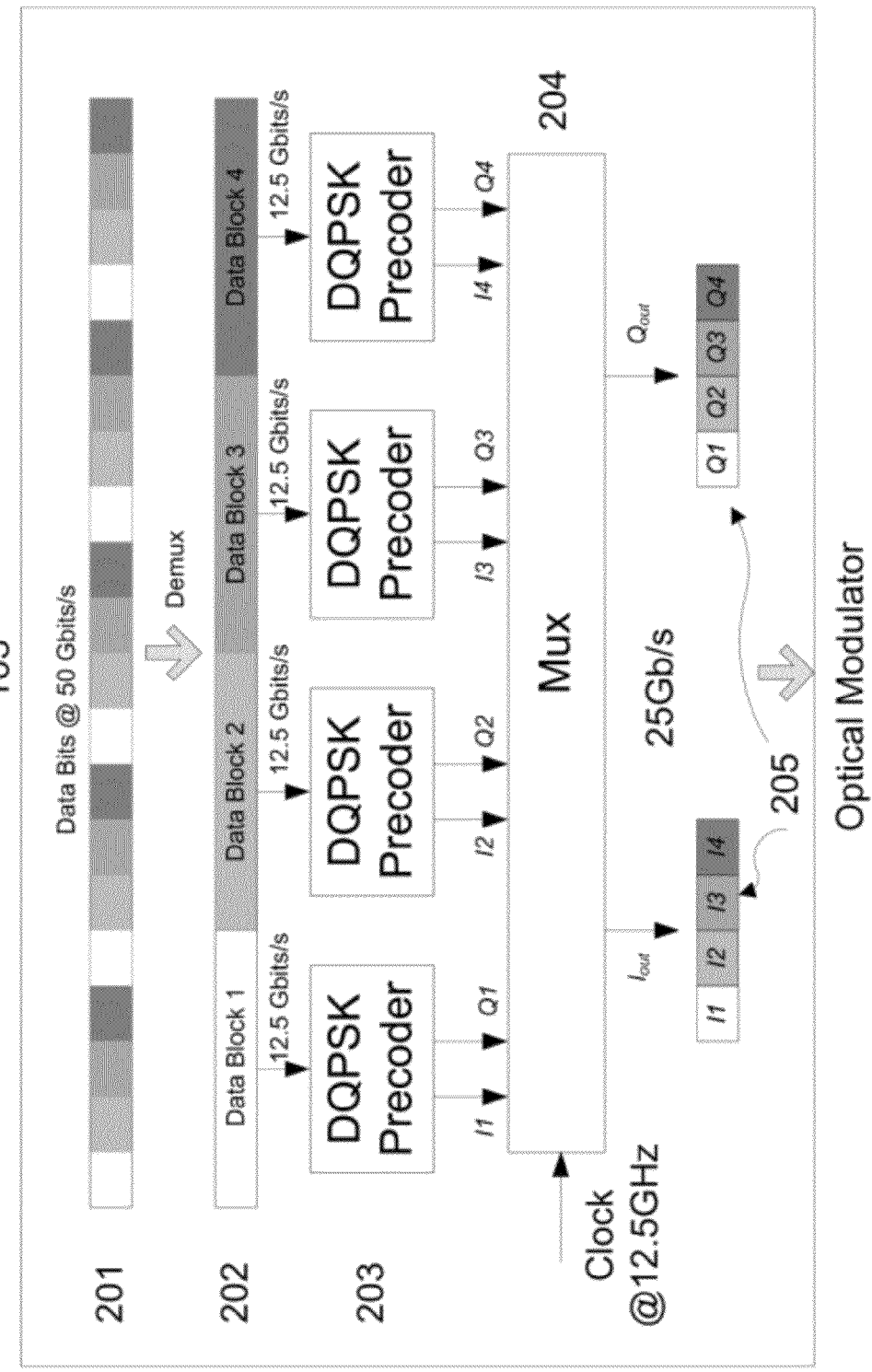
FIG. 2 illustrates bits manipulation for 2 symbol polarization switching in data block unit 103 of FIG. 1, in accordance with the invention.

The detail structure for a 2-symbol polarization-switching DQPSK is illustrated in FIG. 2. Original data bits (201) are first de-multiplexed into several parallel, low-speed data blocks (202). In FIG. 2, a 2-symbol polarization-switching 50 Gb/s DQPSK is used for illustration. Low-speed DQPSK differential precoders (203) are then employed for encoding the bits in each data block. Subsequently, a multiplexer (204) is to combine the four inphase and quadrature inputs, respectively, into higher bit rate ($I_{out}$ and $Q_{out}$) at 25 Gb/s. The outputs of multiplexer (204) drive the optical modulator to generate the DQPSK signals. As a result, the modulation speed of the polarization modulator (104) is also reduced to 6.25 GHz, instead of 12.5 GHz for 1-symbol polarization-switching scheme. The 2-symbol polarization-switched DQPSK signals are plotted in FIG. 3, where the polarization states change from x-polarization to y-polarization by every two symbols. It can be observed that the output pulses (301, 302) are in the same polarization state while the other two pulses (303 and 304) have the orthogonal state. The purpose of this bits manipulation in FIG. 2 ensures that differential detection receiver (105) would correctly recover the encoded bits (201).

Figure 4:
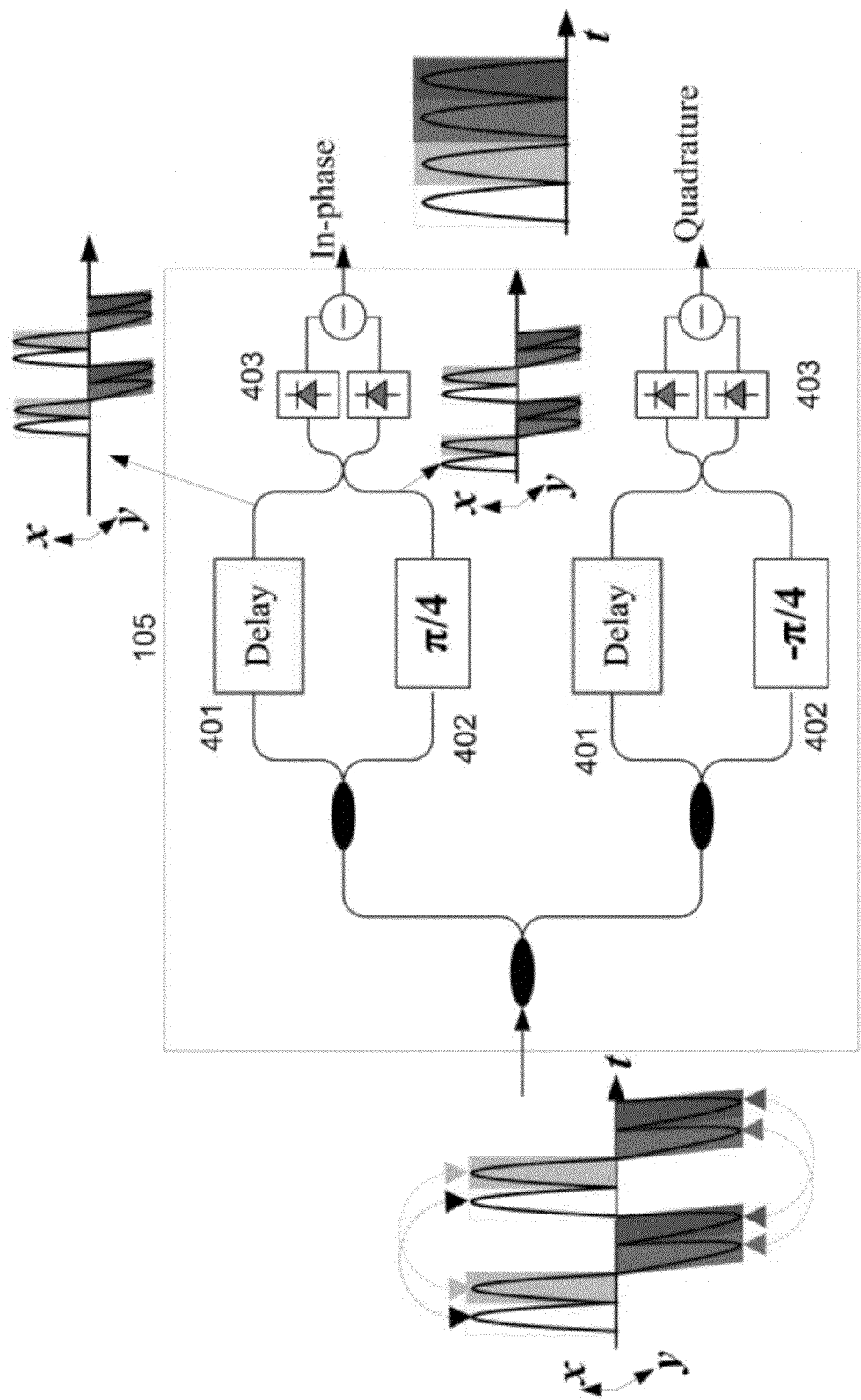
FIG. 4 is a diagram of an exemplary configuration of a DPSK receiver for multi-symbol polarization-switching systems, where Delay=4*40 ps for 2-symbol polarization-switching 50 Gb/s DQPSK, in accordance with the invention.

Block 105 of FIG. 1 is further depicted elaborately in FIG. 4. As for these differential-detection receivers, the beating is possible only if the polarization states of current symbol and its delayed symbols are the same. The received polarization-switched signals are split into two branches, and each is composed of one delay (401), a phase shifter (402) and a pair of balanced detector (403). To make sure the coherent beating, the delay time in Block 401 has been increased to a 4 symbol duration from a 1 symbol duration, and then the demodulated signals are further de-multiplexed into 4 branches for data management.

Figure 5:
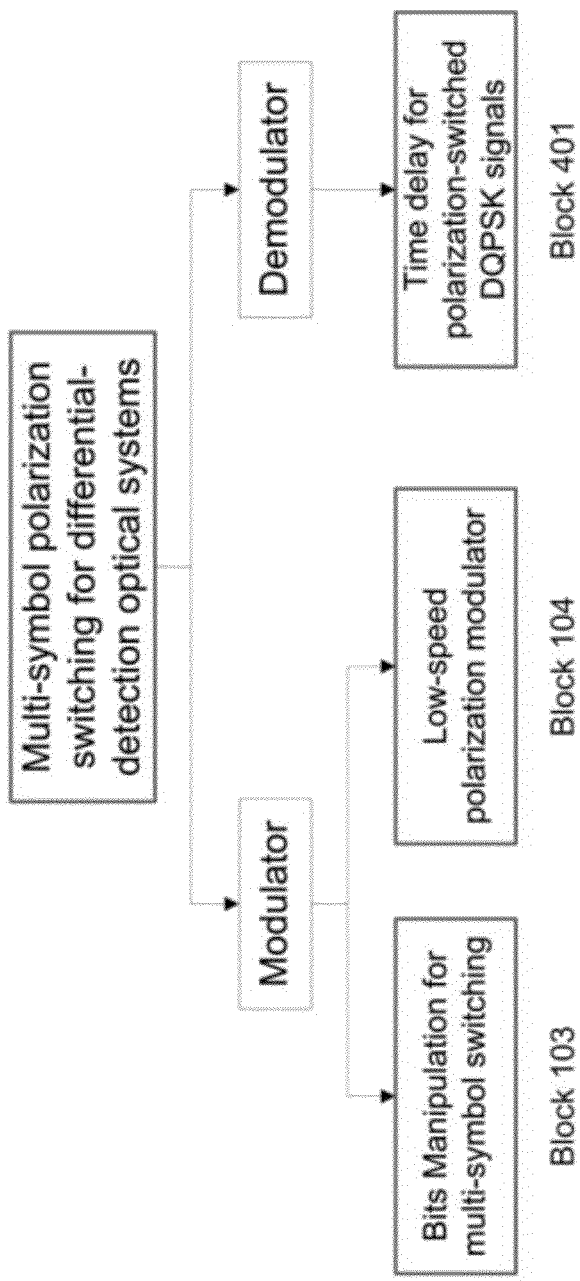
FIG. 5 is a block diagram of key aspects of the present invention.

The block diagram of FIG. 5 presents key aspects of the inventive details discussed above. The inventive multi-symbol polarization switching for differential-detection optical systems entails both modulation and demodulation aspects. The modulation entails bits manipulation for multi-symbol switching 103 and a low speed polarization modulator 104. The demodulation aspect entails a time delay for polarization-switched DQPSK signals 401.

A significant aspect of the present invention includes the feature that the polarization states change every M symbols in differential-detection optical systems, thereby reducing the requirement of polarization modulator bandwidth at the transmitter side. Another significance is configuration of the differential precoder and differential detector to adapt the practical transceiver to the multi-symbol schemes. The low-speed components are sufficient for generating the multi-symbol polarization-switched differential-encoded signals. In addition, this particular configuration of precoding enables the differential receiver correctly recovering the transmitted data.

From the foregoing, it can be appreciated that with the invention, instead of alternating the polarization state symbol-by-symbol, the polarization state varies every several symbols, resulting in reduced bandwidth requirements on polarization switching modulator and its electrical driver. According to our simulated 50 Gb/s RZ-DQPSK results, the performance of 2-symbol polarization-switching case has a quite similar performance as one-symbol polarization-switching scheme. In other words, the invention has the following merits: less complexity, lower cost and high tolerance to fiber nonlinearity as single-symbol polarization switching transmitter. In addition, the design of the transmitter and can be applied in other differential-detection formats, such as DPSK and D8PSK.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method for multi-symbol polarization switching for differential detection optical systems, comprising the steps of:
    modulating output light of a laser source by a DQPSK modulator;
    splitting a stream of data comprising de-multiplexing the stream of data into multiple parallel low-speed data blocks;
    manipulating the low-speed data blocks comprising:
        encoding the bits in each low-speed data block using DQPSK differential precoders; and
        multiplexing to combine four in-phase and four quadrature inputs, I and Q, respectively, to thereby generate multi-symbol DQPSK differential encoded signals, and wherein each multi-symbol comprises four bits;
    driving the DQPSK modulator with the multi-symbol DQPSK differential encoded signals to generate optical multi-symbol DQPSK differential-encoded signals,
    polarizing said optical multi-symbol DQPSK differential-encoded signals with a polarizing modulator to generate optical multi-symbol polarization-switched DQPSK signals, wherein the modulation speed of the polarizing modulator determines how often polarization states vary; and
    recovering correct original data by a receiver using differential detection.

2. The method of claim 1, wherein polarizing said optical multi-symbol DQPSK differential-encoded signals comprises changing polarization states of said optical multi-symbol DQPSK differential-encoded signals from x-polarization to y-polarization by every N symbols, and wherein N output pulses are in a same polarization state while other N pulses have an orthogonal state, thereby enabling that differential detection to correctly recover original data bits.

3. The method of claim 1, wherein said differential detection comprises splitting received polarization-switched signals into two branches with each said branch composed of one delay function, a phase shifter and a pair of balanced detectors.

4. The method of claim 3, wherein said differential detection comprises, to ensure a coherent beating, a delay time in said delay function has been increased to a 4 symbol duration from a 1 symbol duration.

5. The method of claim 4, wherein said differential detection comprises further de-multiplexing said split received polarization-switched signals are further de-multiplexed into 4 branches for data management.

6. The method of claim 1, wherein differential precoders and said differential detection are configured to adapt a transceiver to a mutli-symbol scheme.

* * * * *